United States Patent [19]
Piccolo et al.

[11] 3,878,293
[45] Apr. 15, 1975

[54] PROCESS FOR THE PRODUCTION OF FINELY POWDERED ALUMINUM TRICHLORIDE OF UNIFORM PARTICLE SIZE

[75] Inventors: Luigi Piccolo; Antonio Paolinelli, both of Milan; Marcello Ghirga, Bresso, all of Italy

[73] Assignee: Societa Italiana Resine S.I.R. S.P.A., Milan, Italy

[22] Filed: June 12, 1973

[21] Appl. No.: 369,381

[30] Foreign Application Priority Data
June 13, 1972 Italy .................................. 25582/72

[52] U.S. Cl. ..................... 423/495; 23/294; 23/305
[51] Int. Cl. ............................................. C01f 7/58
[58] Field of Search ............... 423/495; 23/294, 305

[56] References Cited
UNITED STATES PATENTS
3,078,145  2/1963  Gayol .................................. 423/495
3,694,170  9/1972  Fujii et al .......................... 23/305 X FOREIGN PATENTS OR APPLICATIONS
515,992  8/1955  Canada ............................... 423/495
847,119  9/1960  United Kingdom ................... 23/294

Primary Examiner—Edward Stern
Attorney, Agent, or Firm—Sughrue, Rothwell, Mion, Zinn and Macpeak

[57] ABSTRACT

Process for the production of aluminum trichloride from aluminium trichloride vapour which essentially comprises contacting in a sublimate precipitator the hot stream of aluminium trichloride vapour or a hot stream of aluminium trichloride vapour mixed with other gases with a cold stream of an inert gas under conditions that lead to solidification of aluminium trichloride and recovering the solidified aluminum trichloride from the gaseous products. In this process finely powdered aluminium trichloride having a uniform particle size is obtained.

10 Claims, No Drawings

PROCESS FOR THE PRODUCTION OF FINELY POWDERED ALUMINUM TRICHLORIDE OF UNIFORM PARTICLE SIZE

BACKGROUND OF THE INVENTION

1. Field of the Invention

The invention relates to a process for the production of finely powdered aluminium trichloride having a uniform particle size from aluminium trichloride vapour.

2. Description of the Prior Art

Aluminium trichloride is extensively used in industry e.g. as a catalyst for isomerisations, polymerisations, or Friedel-Crafts alkylations. For this purpose, the aluminium trichloride is usually dispersed in organic liquid reaction media. For adequate dispersibility, the aluminium trichloride must be in the form of a uniform, finely divided powder. It is only then that its catalytic activity can become fully effective and the process can proceed smoothly.

In a known process for the production of aluminium trichloride granules, aluminium trichloride vapour is passed through normally tubular metal containers, which are externally cooled e.g. by air or water. This causes the solidification of the aluminium trichloride vapour, which is obtained by sublimation of the solid or as a gaseous product in the reaction of chlorine with a mixture of aluminium oxide or bauxite and charcoal. The same method is also suitable for the precipitation of aluminium trichloride from the gaseous reaction products obtained in the reaction of chlorine or hydrogen chloride with fused aluminium or fluidized aluminium particles. However, the solidification does not proceed satisfactorily, since part of the aluminium trichloride is deposited on the walls of the container and forms deposits, which must be removed with scrapers or vibrators. Part of the aluminium trichloride that does not deposit on the walls of the container is also in the form of a coarse granules having a nonuniform particle size. The product is obtained at the bottom of the container as a nonuniform yellow powder, which contains coarse particles of considerable size from the deposits on the walls. Aluminium trichloride prepared in this way is unfit for practical use, and must therefore be ground. Even after grinding, however, the aluminium trichloride has undesirable properties, e.g. irregular granular form and high density. The bulk density of the ground material is up to 1.0 to 1.2 kg/dm$^3$ (cubic decimeter).

SUMMARY OF THE INVENTION

An object of the invention is therefore to provide a process for the production of finely powdered aluminium trichloride having a uniform particle size, in which a conglomerate-free white product with a particle size of about 1 $\mu$ or less and a bulk density of 0.35 to 0.55 kg/dm$^3$ is obtained in a simple and economical manner.

In accordance with this invention finely powdered aluminium trichloride having a uniform particle size is produced from aluminium trichloride vapour by a process which is characterized in that
a. the aluminium trichloride vapour, optionally mixed with other gases, with a velocity of at least 0.5 m/sec, and
b. a cold stream of inert gas with a velocity of at least 2 m/sec are introduced into a sublimate precipitator, the ratio of the entry flow velocities being in the range between 1:2 and 1:10, the two gas streams coming together at an angle of 20° to 50°, and the temperature of the combined gas mixture not exceeding about 70°C, and the solid aluminium trichloride formed is separated from the gaseous products.

DETAILED DESCRIPTION OF THE INVENTION

The aluminium trichloride vapour used may be obtained from any source; it may be obtained e.g. by sublimation of crude aluminium trichloride, by reaction of aluminium oxide or bauxite with chlorine in the presence of carbon, or by reaction of fused aluminium or flowable aluminium particles with chlorine.

In the process of the invention, the aluminium trichloride vapour and the cold stream of inert gas are introduced separately into the sublimate precipitator. Any metal vessels are suitable for use as precipitators, but elongated cylindrical vessels fitted at the top with two gas jets for the aluminium trichloride vapour and for the inert gas are preferred. Any gas that does not interact with the aluminium trichloride may be used as the inert gas. Air or nitrogen is normally used as the inert gas.

In the process of the invention, the aluminium trichloride vapour is rapidly mixed with the inert gas stream inside the sublimate precipitator; the temperature of the combined gas mixture should be about 70°C or lower. For this purpose, the aluminium trichloride vapour is introduced into the sublimate precipitator at temperatures of 200° to 800°C with a velocity of at least 0.5 m/sec, and the inert gas stream at temperatures of 5° to 35°C with a velocity of at least 2 m/sec, the ratio of the entry flow velocities of inert gas and aluminium trichloride being at least 2:1 to at most 10:1.

It is also important that the two gas streams introduced should form an angle of 20° to 50°, preferably 30° to 40°, between them. The aluminium trichloride vapour is preferably introduced into the sublimate precipitator with a velocity of 0.5 to 7.5 m/sec, and in particular 1 to 3 m/sec. The entry flow velocity of the inert gas is preferably 2 to 20 m/sec, in particular 3 to 9 m/sec.

The conditions must be adjusted so that the temperature after mixing of the two gas streams in the sublimate precipitator is 30° to 70°C. At temperatures above 70°C, aluminium trichloride possesses plastic properties, so that difficulties occur in the subsequent separation from the gas phase. On the other hand, temperatures below 30°C are unsuitable on grounds of economy.

The solid aluminium trichloride obtained is separated from the gaseous products by conventional methods. The gases may be returned to the sublimate precipitator after cooling to about 20° to 30°C.

Aluminium trichloride is formed in the process of the invention as a white powder with a particle size of at most about 1 $\mu$. The powder is extremely uniform; at least 80% of the granules have a particle size of about 0.5 $\mu$. The aluminium trichloride powder contains no conglomerate and has an unusually low bulk density of 0.35 to 0.55 kg/dm$^2$.

Because of the properties mentioned, the aluminium trichloride obtained has outstanding dispersibility in organic solvents, and is therefore particularly suitable for use as a catalyst and for other related applications. The process of the invention is simple and reliable; it involves simple apparatus throughout. For example, cylindrical sublimate precipitators having nozzles at the top with an angle of incidence in the above-mentioned range may be used. Even after long operating times, no deposits are formed on the walls of the sublimate precipitator.

The invention is illustrated by the following non-limiting examples.

EXAMPLE 1

Aluminium trichloride is produced in a vertical, cylindrical metal sublimate precipitator having a diameter of 350 mm and a length of 1200 mm. The precipitator has a coaxially arranged nozzle at the upper end with an internal diameter of 44 mm for the inert gas and a nozzle with an internal diameter of 18 mm for the aluminium trichloride vapour at an angle of incidence of 33° to the former nozzle. The sublimate precipitator is fed with 2.5 kg/hour of a mixture of aluminium trichloride vapour and nitrogen at a rate of 660 Nl/hour. The temperature of the gas stream as it enters the sublimate precipitator is about 300°C. Dry air is introduced as the inert gas at a rate of 28 Nm³/hour, the temperature of the gas stream as it enters the sublimate precipitator being about 25°C. 40 cm from the point at which the two gas stream meet, the temperature of the gas mixture is 55°C. The aluminium trichloride obtained is separated from the gas mixture with the aid of bag filters; it is a flowable, uniform, white dust-like powder. The powder contains no conglomerates; 80% of the aluminium trichloride has a particle size in the range between 1.0 and 1.5 $\mu$, and its bulk density is 0.5 kg/dm³. After operation for 20 hours, the walls of the sublimate precipitator show no deposits.

EXAMPLE 2

The same apparatus is used as in Example 1. The sublimate precipitator is fed with 1.5 kg/hour of a mixture of aluminium trichloride vapour and nitrogen at a rate of 400 Nl/hour. The temperature of the gas stream as it enters the sublimate precipitator is about 300°C. Dry air is introduced as the inert gas at a rate of 28 Nm³/hour, the temperature as it enters the sublimate precipitator being about 25°C. 40 cm from the point at which the two gas streams meet, the temperature of the gas mixture is 51°C. The aluminium trichloride obtained is separated from the gas mixture with the aid of bag filters; 80% of the product has a particle size in the range between 0.5 and 1.0 $\mu$. The bulk density of the aluminium trichloride is 0.39 kg/dm³, and its properties correspond to those of the product from Example 1. After operation for 20 hours, the walls of the sublimate precipitator show no deposits.

EXAMPLE 3

The apparatus of Example 1 is used, but the internal diameter of the inlet nozzle for the inert gas is 52 mm. The sublimate precipitator is fed with aluminium trichloride vapour at a rate of 4 kg/hour; i.e. the feed is practically free from other gases. The temperature of the gas stream as it enters the sublimate precipitator is about 300°C. Dry air is introduced as the inert gas at a rate of 28 Nm³/hour, the temperature as it enters the sublimate precipitator being about 25°C. 40 cm from the point at which the two gas streams meet, the temperature of the gas mixture is 57°C. The aluminium trichloride obtained is separated from the gas mixture with the aid of bag filters; 80% of the product has a particle size in the range between 0.9 and 1.5 $\mu$. The bulk density of the aluminium trichloride obtained is 0.55 kg/dm³, and its other properties correspond to those of the product of Example 1. After operation for 20 hours, the walls of the sublimate precipitator show no deposits.

What we claim is:

1. Process for the production of finely powdered aluminum trichloride of uniform particle size of at most about 1 micron and having a bulk density of 0.35 to 0.55 Kg/dm³ from aluminum trichloride vapour, characterized in that
    a. a gas stream comprising aluminum trichloride vapour with a velocity of at least 0.5 m/sec, and
    b. a cold stream of inert gas with a velocity of at least 2 m/sec are introduced into a sublimate precipitator, the ratio of the entry flow velocities of gas stream comprising aluminum trichloride vapor: inert gas being in the range between 1 : 2 and 1 : 10, the two gas streams meeting at an angle of 20° to 50°, and the temperature of the combined gas mixture is kept at 30° to 70°C to produce said finely powdered aluminum trichloride and the said solid aluminum trichloride formed is separated from the gaseous products.

2. Process in accordance with claim 1, characterized in that the gas stream comprising aluminum trichloride vapour is introduced into the sublimate precipitator at a temperature of 200° to 800°C.

3. Process in accordance with claim 1, characterized in that the gas stream comprising aluminum trichloride vapour is introduced into the sublimate precipitator with a velocity of 0.5 to 7.5 m/sec.

4. Process in accordance with claim 1, characterized in that the inert gas stream is introduced into the sublimate precipitator at a temperature of 5° to 35°C.

5. Process in accordance with claim 1, characterized in that the inert gas stream is introduced into the sublimate precipitator with a velocity of 2 to 20 m/sec.

6. Process in accordance with claim 1, characterized in that air or nitrogen is used as the inert gas.

7. Process in accordance with claim 1, characterized in that the two gas streams meet with an angle of 30° to 40° between them.

8. Process in accordance with claim 3, wherein the velocity of the gas stream comprising aluminum trichloride vapor is 1–3 m/sec.

9. Process in accordance with claim 5 wherein the velocity of the inert gas stream is 3 to 9 m/sec.

10. Process in accordance with claim 6 wherein the inert gas is dry air.

* * * * *